(No Model.)

G. C. BURCH.
VEHICLE SPRING.

No. 509,069. Patented Nov. 21, 1893.

Witnesses
Alonzo M. Luther.
Allen Tenny.

Inventor
George C. Burch.
By his Attorney
Frank H. Allen.

UNITED STATES PATENT OFFICE.

GEORGE C. BURCH, OF WESTERLY, RHODE ISLAND.

VEHICLE-SPRING.

SPECIFICATION forming part of Letters Patent No. 509,069, dated November 21, 1893.

Application filed December 21, 1892. Serial No. 455,953. (No model.)

*To all whom it may concern:*

Be it known that I, GEORGE C. BURCH, a citizen of the United States, residing at Westerly, in the county of Washington and State of Rhode Island, have invented a certain new and useful Improvement in Vehicle-Springs, which improvement is fully set forth and described in the following specification, reference being had to the accompanying sheet of drawings.

The object of this invention is to produce a vehicle spring of light weight, and cheap construction, that may combine elasticity with great strength and which will yield, or spring, in every direction. These desirable results are attained by shaping and supporting a single-leaf spring as hereinafter explained.

Figure 1:
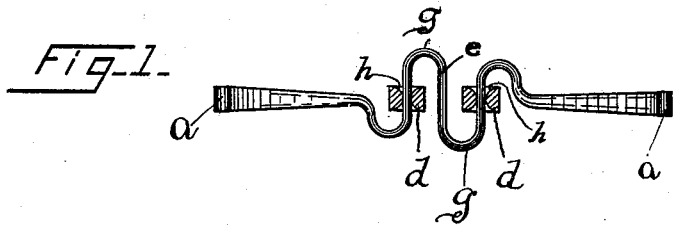
Figure 2:
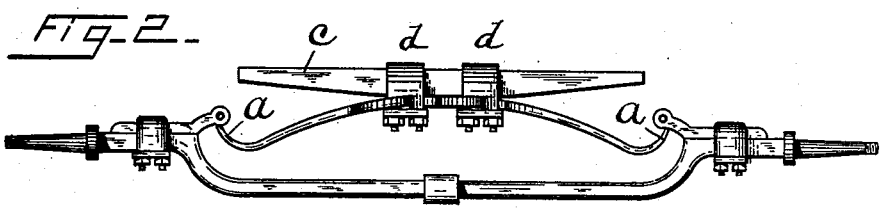
Figure 3:
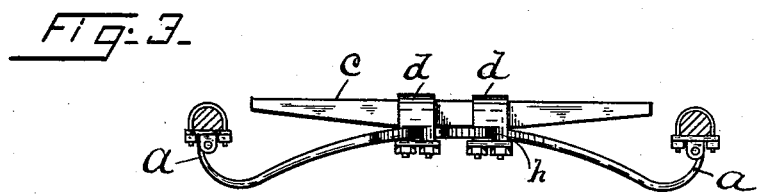
Figure 4:
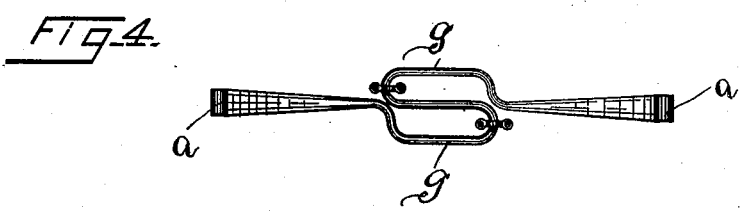

In the annexed drawings Figure 1 is a plan view of a spring embodying my invention, showing also the position and form of the clips by means of which it is secured to a vehicle body. Fig. 2 is an elevation of the same, illustrating also a cross-bar and axle. Fig. 3 illustrates a simple manner of applying my improved spring to side-bar vehicles. Fig. 4 shows a slight modification of my invention.

Referring to the drawings, the letter $a$ denotes the outer ends of my spring, the same being of round steel rod preferably flattened in a horizontal plane and turned to form eyes for use with ordinary clips. The middle portion of said spring is peculiarly bent, forming a plan outline substantially like two letters S, the object of this form being to permit the free ends of the spring to yield laterally, vertically and longitudinally.

The described spring is secured to the vehicle body, or to suitable cross-bars $c$, by strong clips $d$ whose openings are at right angles to the length of the spring and which clasp the middle portion of each S-shaped bend. If desired, the vertical walls of the openings through the clips may be curved as shown at $h$ which will permit of a horizontal motion of the vehicle body more freely than if the walls of the opening fit close against the sides of the spring, as, by making the walls rounded they only touch the spring at a small point upon each side, which will permit the spring to bend or move at all points, whereas, if the walls of the opening were in contact with the spring throughout the thickness of the clip, the portion of the spring within the opening would be held rigid by the contact of the walls and thus the utility of the spring destroyed to that extent. This mode of fastening makes the spring practically a double lever, the clips being the fulcra. When a load is put upon the vehicle and the spring is depressed at its central portion the round rod, of which the spring is made, rocks freely in the clips and the portion $e$, between said clips, yields in a direction corresponding to the length of the complete spring, thus permitting an easy vertical movement. The bends $g$, corresponding to the upper and lower curves of the letters S, permit the spring to yield laterally; that is to say in a horizontal plane. In the spring of Fig. 4 the bends $g$ are shown as very much elongated and the clips narrower than in Fig. 1, but the general form and action of the complete spring remain the same.

Having described my invention, I claim as new and desire to secure by Letters Patent—

In a vehicle, the combination, with a body provided with clips having openings, the vertical walls of which are rounded of springs secured to the body, the central portion of each of which is curved transversely to its length in the form of a double letter S, and means for securing the ends of the springs to the vehicle body, the central portion of the spring being passed through the openings in the clips, said openings being at right angles to the length of the spring, whereby the clips engage with the middle portion of each of the S shaped portions of the springs, substantially as set forth.

GEORGE C. BURCH.

Witnesses:
FRANK H. ALLEN,
ALONZO M. LUTHER.